Patented Nov. 1, 1932

1,886,353

UNITED STATES PATENT OFFICE

EMIL E. NOVOTNY AND CHARLES J. ROMIEUX, OF LOGAN, PENNSYLVANIA, ASSIGNORS TO JOHN STOGDELL STOKES, OF HUNTINGDON VALLEY P. O., PENNSYLVANIA

SYNTHETIC RESIN AND METHOD OF MAKING SAME

No Drawing.   Application filed April 27, 1922. Serial No. 557,010.

This invention relates to synthetic resins and the process of making the same.

As is well known, it has been the practice to make certain synthetic resins of commerce by using a phenol, and an aldehyde, with or without a catalyst, and following out such steps or processes that a resultant product has been what is commonly termed in the art a phenolic condensation product. Of such synthetic resins, "Bakelite," "Condensite," "Redmanol" and others are examples.

We propose in the present instance to provide a synthetic resin which differs radically from the class above mentioned in several important respects. We have made the important discovery that we can take phenol or its equivalent and by merely mixing therewith a natural vegetable product, such as ground corn cob, sawdust or other substances as hereafter mentioned, and then heating this mixture under the conditions and in the manner hereinafter described, we obtain, a synthetic resin which may be fusible, or infusible, according to its treatment. In using the expression natural vegetable product, as above, we mean to define vegetable products in the natural state, or which have been treated or operated upon without altering their chemical nature. For example we use this term to include sawdust, which is made by sawing timber, corn cob cellulose, or other substances hereafter mentioned, as contradistinguished from products which are chemically extracted or derived from natural vegetable products, such for example as formaldehyde, furfural and the like. In other words we do not first have to extract or convert from the natural product certain chemical constituents thereof and then use these chemical constituents in making our synthetic resin, but we can use the vegetable product in practically its natural state, perhaps with the necessity, however, of undergoing the treatment of comminution, grinding, powdering, pulping or the like. According to our understanding and observations, based upon actual experience, a reaction takes place between the phenol or its equivalent and the natural vegetable product, forming a hard, durable, brilliant synthetic resin which may be, as above mentioned, either fusible or infusible according to its process of manufacture.

The advantages of our invention will be realized, when we consider that it is unnecessary to go to the expense of using manufactured chemicals as formaldehyde and others now commonly employed in making synthetic resins, and when it is appreciated that our process is a very quick and inexpensive one from the standpoint of material, time and labor, as it is only necessary for us to dissolve or digest a sufficient amount of vegetable product in a body of phenol or its equivalent, while employing heat, this simple action resulting in the production of the synthetic resin hereinafter described.

Our synthetic resins may be formed by the combination of natural vegetable products, preferably polyoses, with substances such as phenol, urea, vinyl-acetate, etc., that is, substances which may be considered to have a carbon atom to which is linked a hydroxyl or a substituted hydroxyl group and either another carbon atom or a nitrogen atom through a double bond ($=C-OR$) such compounds exhibit keto-enol tautomerism to varying degrees.

These resins may be prepared at will in any degree of fluidity, intermediate between and including a thin syrup and a hard, anhydrous resinous body. These fusible resins are soluble in various solvents producing varnishes utilizable for coating or impregnation. They are readily precipitated out of solution by suitable reagents and onto various bodies or surfaces. In their dry solid state the resins may be powdered and distributed or commingled with various foreign substances such as fillers, coloring matter, etc. These resins are either permanently fusible or potentially reactive and convertible into hard, infusible, insoluble acid and alkali proof materials of great strength.

These resins are utilizable in the arts as fusible, soluble asphaltum or shellac substitutes for surfacing or molding purposes. The potentially reactive form possesses many uses in the mechanical and electrical arts due to their great strength, toughness, and dielectric properties. For example in the manufacture of mechanical and dielectric fibre, molding powders and varnishes, printing plates, sound records, matrices, etc.

These materials may be used for ordinary molding without heat or pressure such as casting, or may be used for cold molding purposes under pressure, or may be molded or formed to their desired shape under the combined action of heat and pressure. These synthetic resins may be converted to their final, hard, set, infusible form at elevated temperatures with and without pressure as the nature of the work warrants.

In practicing this invention we may utilize cheap polyose products, mainly by-products, and chiefly containing cellulose, such as wood, sawdust, wood flour, scrap paper, rice and oat hulls, bran, straw, corn cob cellulose, bagasse fibre, cotton linters, cotton waste and its salvaged products. We are not necessarily, however, limited to the use of these cellulose products, as we may utilize other polyoses, for example, gum arabic, cherry gum, dextrin, starch, cane sugar, vegetable ivory nut, etc. As a matter of fact, it was the experimental work done in connection with the production of furfural resins which has brought to our attention, first, the utilization of the large quantity of corn cob cellulose which is available as a valuable product because of its clean and highly absorbent qualities. This has shown us that cellulose materials are soluble in organic compounds exhibiting keto-enol tautomerism, particularly when slightly acidified, preferably with a mineral acid. This investigation disclosed the fact that it is not at all necessary to first go through the long drawn out distillation process of producing furfural in a large excess of water, as the cellulose and pentose containing bodies will of themselves react directly with phenol-like bodies to form resins. Furthermore, early in the matter of furfural development our efforts have been to endeavor to produce furfural from pentosans without the use of large quantities of water, and the study of this problem has developed the fact that a reaction or combination takes place between cellulose or pentosans and organic compounds exhibiting keto-enol tautomerism such as phenol, urea, vinyl acetate etc., to produce a reaction closely parallel to that with water (hydrolysis). Thus in one step from the natural raw material we are able to dissolve and combine all of the cellulose and pentosans in merely an acidulated, anhydrous, phenol solution by a reaction requiring only a few minutes at a relatively low temperature without counteracting pressure so that large proportions of this polyose material may be combined. This reaction leaves no residue or undissolved particles when clean polyose materials are used. However, the impurities present in wood such as gums and lignin are as completely digested as the pure cellulose. Where bulky, polyose materials are used these can be added gradually until they are dissolved and in solution. This method enables the addition of large quantities of such bulky materials to small quantities of organic compounds which have groupings including a carbon oxygen linkage capable of undergoing keto-enol tautomerism. This reaction may be carried out until all of the organic compounds exhibiting keto-enol tautomerism have been combined or until the desired hardness of material has been produced, which may vary from a thin, syrupy material to a hard, shiny, homogeneous, dry, anhydrous resin of great strength and toughness breaking with a conchoidal fracture. From our reactions thus far no evidence of the formation of any appreciable amount of water of reaction has been found. Should anhydrous materials not be used the water is readily eliminated during the reaction.

We have further discovered that this resin will assume its hard, set and infusible form while the acid catalyst is still present or after the catalyst has been neutralized with a basic material such as lime or ammonia. Furthermore, we have noted that this resin when cut with an alkali to form a water solution, is potentially reactive and preserves this property when precipitated as by aluminum sulphate. We have also found that formaldehyde or materials engendering formaldehyde or its amid act as quick hardening agents either in the presence of an acid or basic catalyst or in a neutral medium. This material may be readily added while the reaction product is still in its syrupy state or may be otherwise incorporated either mechanically or by solution. We have also found that this material will take up furfural, methyl furfural or their amids which act as hardening agents for this reaction, suitable catalysts such as acids or bases being preferably used. The use of hexa-methylene-tetramin, furfuramid or methyl furfuramid permits the use of a dry, anhydrous hardening agent with the dry, anhydrous resin. The use of hexa-methylene tri-phenol, the aniline hydrochloride product of formaldehyde, or the double compounds of hexa-methylene-tetramin will act as hardening agents as well. We have found that the fusible, soluble material is readily soluble in alcohol, acetone, furfural, formalin, selenium oxychloride, and the usual solvents for synthetic resins including basic solutions. As mentioned previously, it may be readily precipitated out of solution to form a finely divided precipitate which may be made to stay in suspension as, for example, the previous mention of the use of aluminum sulphate. It might also be mentioned that dilute acids will act as precipitating agents, and to those familiar with the art various precipitates can readily be obtained. The material readily forms metallic salts whereby the melting point may be increased and the shrinkage of the material considerably decreased if this is desirable for various purposes.

We have produced high-grade molding mixtures superior to phenol formaldehyde condensation products and structures in strength and hardness on a par with products from our phenol furfural resin "Durite." We have used these materials in impregnating and incorporating directly or by precipitation at the beaters with fibrous structures in the preparation of molding powders and boards which can be used in the mechanical and electrical arts, and have produced full working-sized articles such as printing plates, sound records, laminated fibre products, etc., which have proven to be entirely commercial.

In order to thoroughly understand our invention, we will now describe the digester such as may be used and certain specific preferred embodiments thereof given in the form of definite proportional examples.

The equipment is preferably a covered, jacketed kettle, lined with acid resisting material (lead lined), provided with agitator, reflux, and condenser. The kettle is preferably heated with steam and cooled with water and so designed as to withstand an internal pressure of 100 pounds to the square inch.

*Example 1.*—Place in kettle 200 parts molten, anhydrous phenol containing 5 parts of 50% sulphuric acid. To this add in portions as digested 100 parts soft wood sawdust. Maintain at a boil for a period of one to five hours, so as to maintain a fluid condition which is preferable to obtain a uniform reaction inasmuch as the sawdust is bulky and porous, it is added in small portions. In this example in order to ensure complete digestion and combination of the cellulose the proportion of phenol is in excess of that which will combine with all of the cellulose. In other words it is far simpler to remove excess phenol than it is to remove excess cellulose. The reflux may now be closed and excess phenol allowed to distill from the kettle and condense into a suitable receptacle. Any small quantity of moisture present will pass off with the phenol and separate in a watery layer in the top of the receptacle. The material may now be removed from the kettle into suitable pans and will be found to have the properties of a potentially reactive, dry, anhydrous, and, when cooled, solid resin. This material is now in condition to be ground for mechanical incorporation with various fillers or may be dissolved in the usual solvents such as alcohol, acetone, etc., or put into water solution by the use of about 10 to 15% of its weight of 76% caustic soda. This alkaline solution of resin may be used for impregnation or may be mixed with the cellulose fibres at the beaters of the paper mill and the resin may then be precipitated onto the fibres by the use of a slight excess of aluminum sulphate.

*Example 2.*—For certain purposes it will be found preferable to eliminate the acid catalyst from the resinous material as described in Example 1. This is preferably accomplished by adding a sufficient amount of suitable alkali material to the mass after the reaction has been completed but before the distillation of the excess phenol and other extraneous volatile matter so that a thin fluid mass is still present and therefore better distribution of the neutralizing agent is thereby obtained. We may use alkali or alkaline earth metal carbonates or hydroxides, or we may use ammonia dry or in solution. The potential reactivity of the resin is thus decreased. The neutralizing agent is added early in the reaction. Then after neutralization excess phenol and volatile impurities may be removed by distillation. To the resulting fluid, syrupy product, cooled to 100° F., for the purpose of accelerating the hardening reaction, we add from 10 to 20 parts of a 40% formalin solution, preferably about 15 parts. This cooling is effected by admission of water in the jacket. The water is closed off, steam is again admitted, and the mass is heated to a temperature of approximately 150 F.° when an exothermic reaction takes place. The steam is now closed off, and the temperature of itself rises to approximately 212° F.; water from the formalin will then distill off. When the exothermic reaction ceases the formaldehyde has combined, resulting in a potentially reactive condensation product. The material may be dissolved while warm or in any other suitable way in the usual solvents previously mentioned, and it is obvious, of course, that where it is to be impregnated or incorporated into various fibrous or porous structures it need not be anhydrous.

*Example 3.*—When it is desired to produce a slow reacting or permanently fusible resin we proceed as in Example 2 up to the point where the basic material is added for the purpose of neutralizing the reaction product. Excess phenol and volatile impurities are now removed by distillation and the resin emptied into suitable pans. This resin may be used as a substitute for asphaltum or shellac mixtures or may be ground and mixed with suitable, dry, anhydrous forms of formaldehyde such as hexamethylenetetramin, paraform, or furfuramid, etc., or these materials may be introduced through a common solvent. This will permit of the production of dry, anhydrous molding preparations of either the slow, reactive type or those having quick reactive tendencies. To 100 parts of dry, anhydrous resin from 2 to 10 parts of hexamethylenetetramin may be used or from 2 to 15 parts of furfuramid all by weight.

For the sawdust specified in Examples 1, 2 and 3, we may substitute corn cobs (preferably comminuted), corn cob celulose (by-product material from the production of furfural), oat and rice hulls, which react and produce materials quite similar to those produced from sawdust. The same procedure may be followed except that it will be found that this form of cellulose is more bulky and should be added in smaller portions at a time. Although the sulphuric acid works very well as a catalyst with these products, experimentation has proven that approximately 5 parts of 37% hydrochloric acid will catalyze the reaction satisfactorily. Similar reactions with paper scrap, cotton products, starch, or starch producing materials can be carried out. However, the sawdust and other cellulose materials produce high grade results and are by far the most available as true by-products.

*Example 4.*—Using the same proportions of materials and following the same procedures as given in Examples 1, 2 and 3, vinyl-acetate may be substituted for the phenol, resulting in a very hard, tough, condensation product.

*Example 5.*—We find that urea reacts with these polyose bodies producing syrupy, rubbery or hard, dry, resinous bodies which are reactive under similar conditions and may be treated in the same manner as in the examples given for phenol. In this specific example we use 100 parts urea, 100 parts dry, anhydrous corn starch, and 5 parts of a mineral acid catalyst such as sulphuric of 50% strength. The reaction is obtained exactly as described in Examples 1, 2 and 3, resulting in a soluble, fusible resin which is reactive without the addition of any further hardening agents, or to which may be added formaldehyde or furfural or methyl furfural, their amids, or substances engendering these materials.

*Example 6.*—To obtain a quick commercial reaction without a catalyst we find a high temperature advantageous. Place in pressure resisting kettle 200 parts molten, anhydrous phenol containing 5 parts of 50% sulphuric acid. Place in a pressure balancing container connected to and above the kettle, 100 parts soft wood sawdust. Bring molten phenol to a boil or about 350° F. Introduce from balancing pressure chamber about half of the sawdust and mix thoroughly with agitator. Close kettle to the atmosphere, raise temperature to a maximum of 450° F. allowing the pressure to build up in the container but not to exceed 100 pounds to the square inch. In about an hour add the remaining sawdust and continue digestion until complete. The product thus obtained is very thin and fluid. By continuing the reaction at this elevated temperature after complete digestion for from one to five hours, anything from the above thin liquid to a solid fusible resin and even an infusible resin may be produced. When the reaction has proceeded to the desired stage, the condenser valve is slowly opened to gradually release pressure. The ensuing distillation is allowed to continue until the excess phenol and volatile impurities are removed. As in Example 2 after cooling to temperature therein stated formalin solution may be added and the reaction continued as prescribed therein. Or the material may be poured into suitable pans or utilized as described in Example 3.

Where a quick reaction is required and where the amids such as hexamethylenetetramin or furfuramid are not used, an accelerating agent may be introduced in the form of either an acid or acid salt, or a base or basic salt as, for example, small quantities of sulphuric acid or potassium carbonate or potassium acid sulphate, or in the case of bases potassium carbonate, lime, etc. Where the condensation product however is produced by having added thereto a quantity of formalin or furfural, a small amount of ammonia may be added, either dry or in solution, which will combine with the material and act as an accelerating agent.

We wish it to be understood that any fillers, pigments, colors, or lubricants as known to the art may be mixed or incorporated with this material in any well known manner at any stage of the reactions.

Where we have herein used the term organic compounds which have groupings including a carbon oxygen linkage capable of undergoing keto-enol tautomerism we wish it to be understood as including, not only the substance commonly known as phenol, but also for present purposes, as equivalent thereof such substances as cresol, resorcinol, naphthol and their homologues, as well as vinyl acetate and other esters of vinyl alcohol, its homologues and also urea including the salts of urea.

Wherein we have used the term polyose we wish it to include all carbohydrates which upon hydrolysis yield a monose. (See Organic Chemistry by A. F. Holleman, fifth English edition, 1920, page 261.)

What we claim is—

1. A resinous product resulting from reacting a phenol with a carbohydrate at temperatures above the normal boiling points of the components and under a pressure greater than atmospheric pressure.

2. A resinous product resulting from reacting a phenol with a cellulose at temperatures above the normal boiling point of the phenol and under pressures greater than atmospheric pressure.

3. A potentially reactive resinous product resulting from reacting a phenol with a cellulosic material at temperatures above the normal boiling point of the phenol and under pressures greater than atmospheric pressure and adding a methylene containing body as a hardening agent for said product.

4. A potentially reactive resinous product resulting from reacting a phenol with a cellulosic material, in the presence of a catalyst, and at temperatures above the normal boiling point of the phenol and under pressures greater than atmospheric pressure and adding a methylene containing body as a hardening agent for said resin.

5. The herein described method of making a synthetic resin comprising heating under a pressure greater than atmospheric pressure a mixture of a phenol and a carbohydrate to a temperature above the normal boiling point of any of the components.

6. The herein described method of making a synthetic resin comprising heating under a pressure greater than atmospheric pressure a mixture of a phenol and a cellulose to a temperature above the normal boiling point of any of the components.

7. The herein described method of making a potentially reactive synthetic resin comprising heating under a pressure greater than atmospheric pressure a mixture of a phenol and a cellulose in the presence of a catalyst to a temperature higher than the boiling points of any of the components whereby a resinous product is obtained and adding a methylene containing body to act as a hardening agent for said product.

8. A phenol resin composition comprising a resinous reaction product of a carbohydrate and a phenol including furfural and ammonia, said product convertible by heat to a hard, infusible and set composition.

9. A hard, set, infusible and ultimate composition of matter comprising a resinous reaction product of a carbohydrate and a phenol and including furfural combined therewith by means of a chemical reaction.

10. A phenol resin composition comprising a resinous reaction product of a carbohydrate and a phenol and including furfural as a solvent and hardening agent, said product convertible by heat to a hard, infusible and set composition.

11. A hard, set, infusible and ultimate composition of matter comprising a phenol resin reaction product of a carbohydrate and a phenol and including a furfural and ammonia reaction product.

12. A phenol resin composition comprising a resinous reaction product of a carbohydrate and a phenol and including methyl furfural, said product convertible by heat to a hard, infusible and set composition.

13. The herein described method of producing a potentially reaction phenol resin comprising reacting on a carbohydrate with a phenol to provide a fusible phenol resin and then adding furfural.

14. The herein described method of producing a potentially reactive phenol resin comprising the steps of reacting on a carbohydrate with a phenol to provide a fusible phenol resin and then adding a furfural and ammonia.

Signed at Philadelphia in the county of Philadelphia and State of Pennsylvania this 25th day of April A. D. 1922.

EMIL E. NOVOTNY.
CHARLES J. ROMIEUX.